Jan. 9, 1945. W. A. AYRES 2,366,827
RECORD SENSING DEVICE
Filed Dec. 15, 1939 3 Sheets-Sheet 1
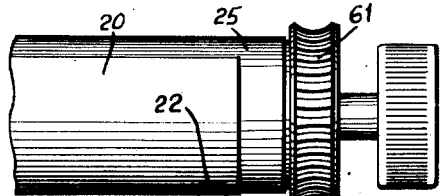
FIG.1.
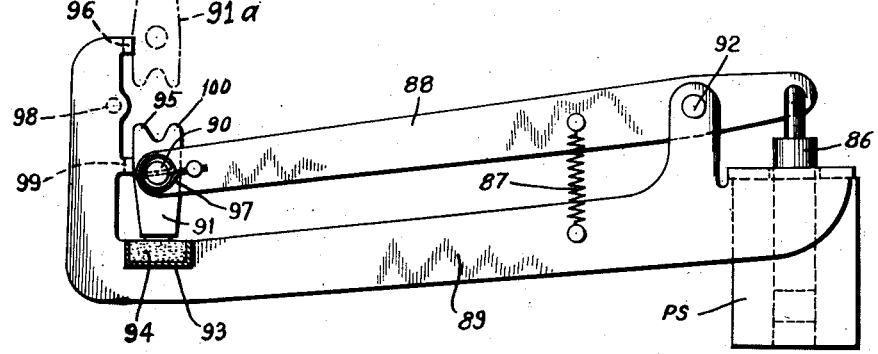
FIG.14.
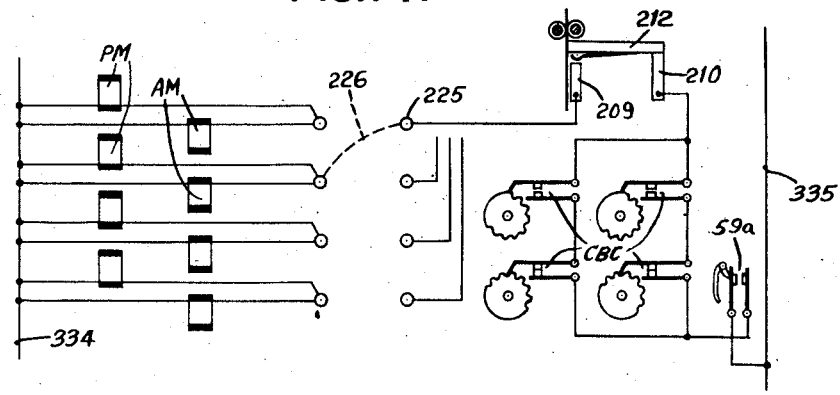
FIG.4a.
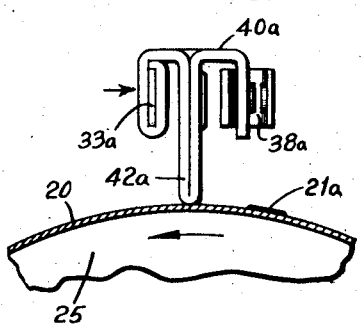
INVENTOR
Waldemar A. Ayres
BY
ATTORNEY.

Jan. 9, 1945.   W. A. AYRES   2,366,827
RECORD SENSING DEVICE
Filed Dec. 15, 1939   3 Sheets-Sheet 2
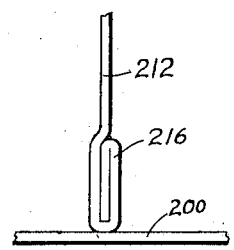
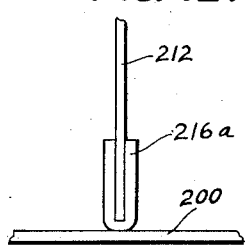
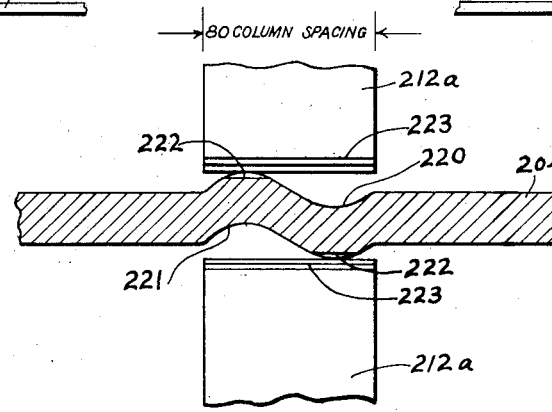
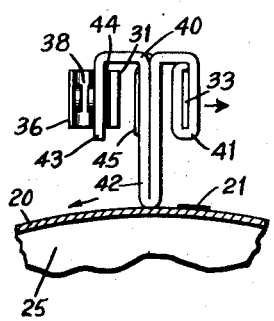
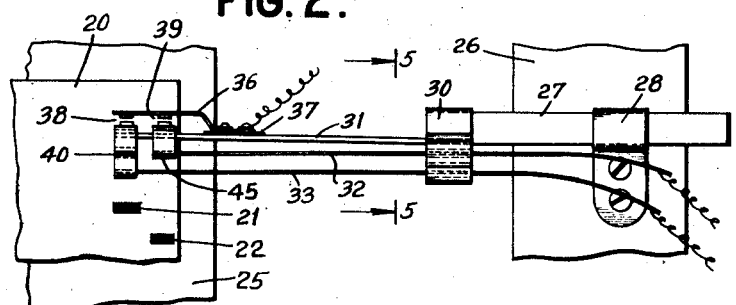
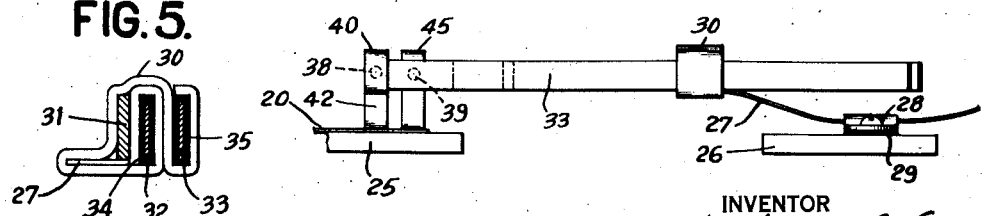
INVENTOR
Waldemar A. Ayres
BY
ATTORNEY Jan. 9, 1945.  W. A. AYRES  2,366,827
RECORD SENSING DEVICE
Filed Dec. 15, 1939  3 Sheets-Sheet 3

INVENTOR
Waldemar A. Ayres
BY
ATTORNEY

Patented Jan. 9, 1945

2,366,827

UNITED STATES PATENT OFFICE 2,366,827

RECORD SENSING DEVICE

Waldemar A. Ayres, Elmhurst, Long Island, N. Y., assignor to International Business Machines Corporation, New York, N. Y., a corporation of New York Application December 15, 1939, Serial No. 309,445

8 Claims. (Cl. 235—61.11)

This invention relates generally to improvements in devices for sensing index points on accounting records and more specifically to means for sensing a record to detect frictional characteristics at differential points which are provided to control the accumulation and recording of the data represented.

In the record controlled accounting machine art, it is customary to use cards which are perforated at differential points to be representative of data. These perforations are sensed electrically by brushes, or mechanically by pins, to control settable devices for adding and printing the data represented by the perforations. While the perforated cards are satisfactory, punching the records involves perforating devices of precision manufacture. Furthermore there are the limitations of the existing system in that the record element is weakened in proportion to the number of index points cut therein and the area of the element receptive to printed information is limited by the portions cut out to provide control perforations.

An object of the present invention is to provide record sensing devices responsive to index points in the form of frictional surface marks which do not weaken the element and do not interfere with printed matter on the element. The friction material may be colorless to avoid confusion with the printed matter over which it may be placed.

A feature of the invention is the use of sets of sensing devices cooperating with both sides of a machine control element bearing differentially placed friction material, thus doubling the data representing capacity of the element.

A further object of the invention is the provision of surface sensing devices for detecting record areas of differing frictional characteristics. The devices are designed to close contacts and set up electrical feeding, adding and printing control circuits whenever a distinctive frictional index area is encountered, said area being of either a higher or lower coefficient of friction than the surrounding surface of the record.

It is also an object of the invention to provide record sensing devices sensitive to all types of data representation.

The sensing devices when adapted to distinguish between areas of differing frictional nature are also suited to sense incised or embossed points as well as the usual perforated index positions, thus making the sensing controls of a kind universal to all forms of records.

Other objects of the invention will be pointed out in the following description and claims and illustrated in the accompanying drawings, which disclose, by way of example, the principle of the invention and the best modes, which have been contemplated, of applying that principle.

In the drawings:

Fig. 1 is a plan view of the marking devices for placing control friction marks on sheets.

Fig. 2 is a plan view of dual mark sensing devices adapted to cooperate with the record sheets.

Fig. 3 is a side elevation view of the sensing devices shown in Fig. 2.

Fig. 4 is an end view of one of the sensing fingers shown in Fig. 2 cooperating with a sheet having spots of friction on a surface of less friction.

Fig. 4a is an end view of a sensing finger arranged in the reverse manner to that of Fig. 4 to bear on a sheet with a high coefficient of friction containing index points of less friction.

Fig. 5 is a sectional view taken along line 5—5 in Fig. 2 and looking on the sensing members in the direction of the arrows.

Figs. 11 and 12 show alternative methods of forming the sensing end of the record feeler fingers.

Fig. 13 shows an alternative method of crimping a record element so that two embossed ridges are within the usual eighty column spacing and on opposite sides of the record element. An area of friction is incised at a particular index point to cooperate with and actuate a serrated point of a sensing element as the record is drawn past the sensing position.

Fig. 14 is a wiring diagram of a portion of an electric accounting machine showing the friction indicia sensing means connected therein to control accumulation and printing.

Figure 6:
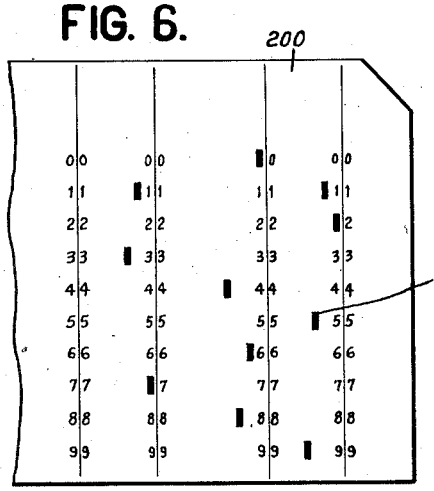
Fig. 6 shows one side of a record card marked with friction material to form data representing index points.

Illustrated in Figs. 2-5 is a dual form of friction sensing devices adapted to sense the presence of marks, such as the marks 21 and 22. Upon a fixed portion of a frame 26 there is assembled a leaf spring 27 adjustably held on the frame by a clamp 28 which is insulated by a strip 29. Fixed on the end of spring 27 is a contact blade holder 30 carrying a stiff contact stop member 31 and two flexible contact making blades 32 and 33. Referring to the sectional view shown in Fig. 9, it is seen that holder 30 is formed of a single piece of strip stock which is bent to engage the spring 27 in a fixed manner, while also providing an opening in which member 31 is held and sockets wherein insulating bushings 34 and 35 are assembled to provide holders for the adjustable blades 32 and 33.

Attached to member 31, but insulated therefrom is a contact holder 36 bearing two points of the pairs of contacts 38 and 39. Strip 37 is an insulator for the holder 36.

Assembled on the left end of the outer blade 33 is a mark sensing finger 40 which is shaped as shown in Fig. 4. There it is seen that the finger is made up of a continuous length of strip material bent in a form designed to carry out all the sensing functions. One side 41 of the finger 40 is clamped around the blade 33 to hold it thereon. The center part of the finger is bent downward and then upward in an elongated U form, the bottom of which is rounded to contact the surface of the record material and there encounter and detect various frictional differences such as presented by the mark 21 of a higher coefficient of friction than the record 20 upon which it appears. Extending over from the U-shaped portion of the finger 40 is an L-shaped extension 43 which passes beyond the stiff member 31 and carries one point of a pair of contacts 38. An insulation piece 44 is attached to stop member 31 and, although the tension in blade 33 tends to move extension 43 against member 31, insulator 44 keeps them separated as shown until they are separated further when mark 21 causes movement of the finger to the left, at which time blade 33 is momentarily flexed while contacts 38 are closed.

Another somewhat similar sensing finger 45 is attached to the other blade 32. This sensing finger also has a formation such as the elongated portion 42 and the angular stop 43. However, the elongated portion also acts as a clamp in its upper section to attach the finger to the blade 32. This sensing finger 45 also carries one contact point of a pair of contacts 39 and cooperates with a strip of insulation on member 31 which holds it in a position wherein the contacts are normally opened.

In Fig. 2 it is seen that the two sensing figures 40 and 45 are situated to cooperate with different portions of the margin of sheets, such as record 20. Finger 40 is positioned to detect the appearance of mark 21 located in relation with the initial printing position of the ledger sheet. The other sensing finger 45 is located to detect the appearance of line spacing marks 22.

The pressure with which said fingers bear down on records may be varied by adjusting spring 27 to lengthen or shorten it, and the positions of the fingers may be varied by shifting blades 32 and 33 back or forth in the holder 30 and sliding meber 31 along therewith. Of course, when adjustments of a substantial extent are made, the contact holder 36 must be replaced with another bracket having contact points spaced to coincide with the new positions of the sensing fingers. The relative tension between blades 32 and 33 and holding spring 27 may be varied by shifting the holder 30 along so that the effective working part of the blades 32 and 33 is shortened at the same time that the effective part of spring 27 is lengthened, or these adjustments may be reversed when found necessary by the frictional nature of the record material or the marks thereon. When a high degree of sensitivity is required, spring 27 must be adjusted to press lightly on the records and blades 32 and 33 must be of such length as to allow free movement of the sensing portions at the ends of the blades.

The arrangement of the sensing device in Fig. 4 is designed to detect the appearance of a friction mark on a surface of less friction. A reverse arrangement such as that shown in Fig. 4a can be used when it is desired to detect marks 21a of a low frictional coefficient on a surface of highly frictional nature. The contacts 38a are normally closed and blade 33a tends to keep them that way, but upon engagement of end 42a with the friction surface of sheet 20, the contacts 38a are opened and held open until the mark 21a of wax, graphite, powder, or the like, is engaged. Then the end 42a skids over the mark and towards the right to close contacts 38a momentarily, and again open them as the sheet surface engages the end 42a and moves it towards the left. In this modification it may be noted that a depression or perforation in the record causes the same contact closing action as a mark 21a.

It is understood that circuit breaker devices are used to render ineffective the normal closure of the contacts in the device of Fig. 4a, and a similar precaution is taken to make ineffective all impulses initiated when the sensing device of Fig. 4 strikes the edges of sheets.

The devices for marking a series of marginal friction control designations on a sheet are shown in Fig. 1. There it is seen that a solenoid PS contains a core piece 86 which is normally drawn upward by a lever 88 pivoted at 92 on a bracket 89. A spring 87 is drawn between the lever and the bracket to hold the lever normally positioned as shown.

Pivoted on the left end of lever 88 is an impression arm 91 attached to a stud 90. Lever 88 fits loosely over the stud 90 and under a washer which is confined thereon by the end of a spiral spring 97 one end of which is attached near the top of stud 90 and the other end fixed to a pin on the lever. This spring 97 tends to move arm 91 parallel with the end of the lever but the arm is operated positively to oscillate between the position shown, wherein it rests on a pad 94 containing friction material, and the dotted line position 91a wherein it effects an impression to deposit the friction material as a mark 22 on sheet 20.

The oscillating movement of arm 91 is governed by portions of bracket 89 in the form of extending lugs 98 and 99 and pin 96 which cooperate with teeth 95 and 100 on the arm. When the solenoid PS is energized, core piece 86 is attracted and the connected lever 88 is rocked clockwise. Then, as center 90 moves upward, spring 97 rocks arm 91 counterclockwise, inserting tooth 95 between lug 99 and pin 96. After the arm 91 has rocked through an angle of 90 degrees, the spring 97 is no longer tensioned, but then the pin 98 is in positive engagement between teeth 95 and 100 and as the lever 88 rocks further the pin turns the arm through the greater part of another 90 degrees the final portion of which movement is directed at right angles to platen 25 with the side of arm 91 sliding along the side of lug 96. The impression arm 91 then strikes against the record sheet in a direct perpendicular blow to impress the friction material thereon. If a solid crayon, wax, or the like, are to be marked thereon, the arm may be made longer and tipped with the solid material which is then marked on with the arcuate penciling movement.

During the second 90 degrees of the printing movement of arm 91, spring 97 is tensioned and tends to turn the arm clockwise but is prevented by the contact of the arm against lug 96. However, when the solenoid PS is deenergized, spring 87 becomes effective to pull lever 88 down, and then arm 91 turns 180 degrees in a clockwise direction. The final portion of the arm movement is brought about by the engagement of pin 98 with tooth 100 and the turning of tooth 95 around lug 99. As lever 88 nears the end of the return stroke, the side of arm 91 slides along the side of lug 99 and the point of the impression arm is directed perpendicularly into the pad 94 which is held on the bracket 89 by a cup 93.

Before pointing out the various combinations of substances from which the records and index points may be constituted, it may be explained that the variations are as numerous as the kinds of matter to be found with different frictional characteristics. As a general rule, materials with rough, hard surfaces were found to have a low coefficient of friction and the cooperating sensing finger slid over such surfaces but was retarded when a spot of rubber, gum, wax or pitch engaged the finger.

The materials found satisfactory for establishing areas of friction on record members of a low friction surface such as sheet metal, card stock, newsprint, typewriter paper, or the like are as follows:

| Rubber | Wax |
| --- | --- |
| Rubber cement and pitch<br>Lotol<br>Lotol and machine oil<br>Latex and glue<br>Neoprene cement, resin and turpentine | Beeswax<br>Paraffin<br>Crayon<br>China marking pencil or any of the above dissolved in alcohol, acetone, turpentine, carbon disulphide or benzol |

| Gum | Pitch |
| --- | --- |
| Resin<br>Resin, turpentine, rubber cement and machine oil | Fluid pitch<br>Pitch dissolved in benzine, gasoline or carbon tetrachloride |

The materials which performed satisfactorily in creating areas of a low coefficient of friction on record members of a higher frictional value such as sheet aluminum, weighted papers, and other materials smooth to the touch, were found to be graphite, wax, china marking pencil, or the foregoing dissolved in alcohol, acetone, turpentine, carbon-disulphide, or benzol. In record members of this kind, perforations and depressions are as effective as the low friction material in influencing movement of the sensing fingers.

From the foregoing, it is apparent that some marking materials are effective on either kind of record. This is so when the frictional index of the material is midway between the friction values of the surfaces of record members having extremely high or low coefficients of friction.

The friction material when in the form of a solid may be marked or deposited on the records in the differential positions. When liquified it may be carried on ribbons or pads and transferred therefrom to the record material in any well known manner of printing. Coloring pigment may be added to the friction deposit material when distinctive character or index point outlines are to be made, otherwise a clear colorless deposit will serve for most purposes. The friction materials may also be either the same color as the background or contrasted therewith according to the purpose of hiding or revealing the marks.

Instead of using material to form a frictional area a certain portion or area of the surface of a record may be treated mechanically to create a surface having a coefficient of friction differing from the surrounding areas. The printing impression arm 91, described hereinbefore, can be formed with a striking face that acts mechanically to indent, emboss, roughen or smooth a record surface, rather than deposit material thereon.

Figure 7:
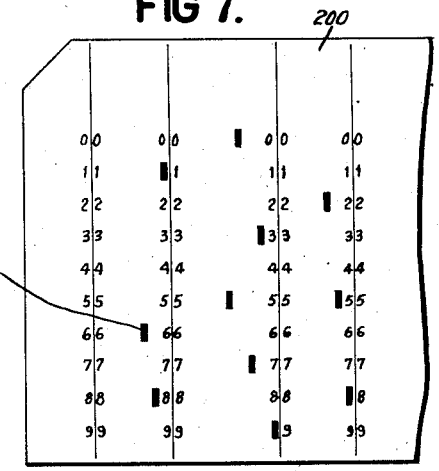
Fig. 7 shows the other side of the card shown in Fig. 6.

Another important feature of the present invention is the marking of such frictional areas at differential points on record cards and the cooperation therewith of devices for sensing the marks and controlling the accumulation and printing of the data represented by the marks. For example, in Figs. 6 and 7 the two sides of a portion of a record card 200 are seen to carry a series of frictional marks 201 situated horizontally in various denominational order positions and arranged vertically from the bottom reference edge of the card to be representative of the various digits. The placement of the marks corresponds with the perforation positions in control elements are are usually punched in a way well known in the art. However, the disclosed method of providing an index point has the advantage that it does not weaken the record element and it also enlarges the capacity of the element, since the marks may be made on both sides of the element and sensed as shown in Fig. 8.

Figure 9:
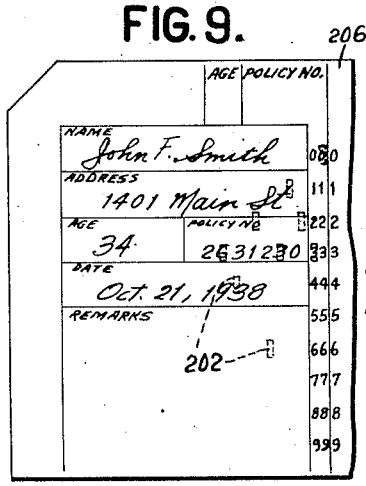
Fig. 9 is a portion of the record element carrying printed and written matter over which colorless friction index points are marked.

A further advantage in the use of frictional index points is illustrated on the record 206 shown in Fig. 9. There it is seen that a number of index points 202 are of colorless friction material and represented by a dotted outline, although these marks are transparent and do not interfere with the written and printed matter over which they are placed.

Figure 7A:
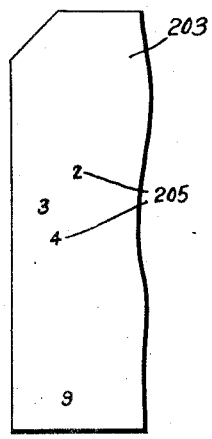
Fig. 7a shows a portion of the record element whereon the index points are printed as readable characters composed of friction material suitable for controlling the sensing devices.

Fig. 7a illustrates a still further advantage gained by the use of marking material having frictional characteristics. The record element 203 carries a series of numerals 205 which not only represents the amount 34.92 but they are also differentially placed and made of a frictional substance to cooperate with sensing devices, so that the amount they represent may be read off the element and used to control adding and printing devices.

Figure 8:
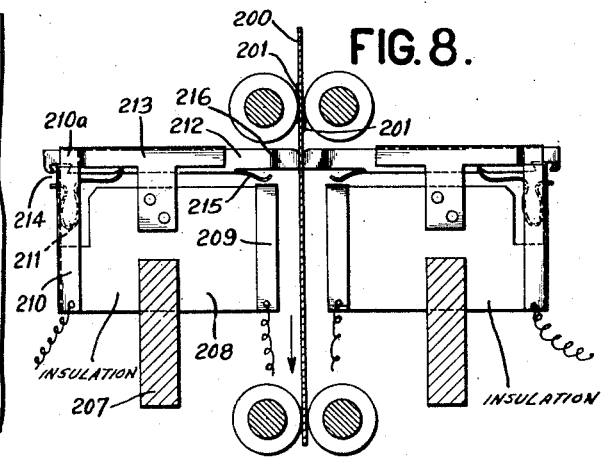
Fig. 8 is an elevation view showing two friction mark sensing devices cooperating with the opposite sides of a record element such as the card shown in Figs. 6 and 7.

In Fig. 8 is shown a form of sensing device adapted to be influenced by the varying frictional characteristics of the surface on a record element 200. Although the sensing devices are shown duplicated on the opposite sides of the record, only one set need be considered since they are similar in all respects. A comb 207 is fixed across the machine and supports a series of insulation members 208, one for each denominational order. Clamped to the front end of each insulation member 208 is a metallic strip 209 carrying the terminal for one end of the electrical connections through the sensing device. Clamped at the opposite end of member 208 is another metallic strip 210 formed as a channel containing a wire bow spring 211 engaging in a notch cut into the bottom edge of a sliding sensing finger 212. Finger 212 is guided in the horizontal part of a T-shaped channel 213 riveted on the top of insulation member 208. The rear end of finger 212 is notched at 214 to cooperate with the upper edge of channel 210 to limit the sliding movement of finger 212 when the record 200 moves away from the sensing devices. An extension 210a on channel 210 presses against the side of finger 212 and maintains electrical circuit connection between the two parts.

Spring 211 serves to hold finger 212 upward so that a contact extension 215 thereon is normally separated from the contact piece 209 attached to the front of the insulation blank 208. The spring also provides a horizontal thrust to press the forward end of the finger against the record material so that the finger remains in the upper position shown until it encounters an area of such a frictional nature that the end of the finger is carried along therewith and down to close a circuit between contact 215 and strip 209.

Figure 10:
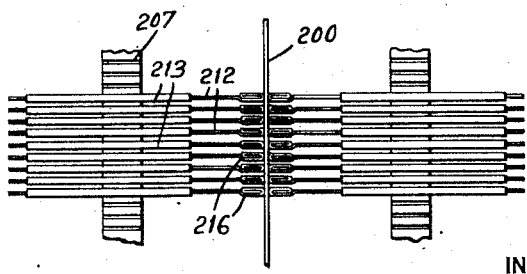
Fig. 10 is a plan view of a series of sensing devices cooperating with both sides of a record element and spaced to coincide with the regular columnar spacing of the eighty column card.

The front end 216 of the sensing finger 212 may be made in various formations as illustrated in Figs. 11 and 12. In Fig. 11 it is seen that the end cooperating with the surface of the record material is formed by coiling the end of end the finger 212 within a U-shaped formation and then compressing the end to shape it within the regular 80 column spacing of the record as seen in Fig. 10. In Fig. 12 another way of forming the end is shown and there it is seen that a separate piece 216a is wrapped around the point of the finger. The fingers and the ends thereon may be made of various material to get the frictional characteristics desired. For example, it is known that metals such as aluminum, lead, and bronze have a higher coefficient of friction than other metals, such as steel, chromium and nickel, when other factors such as, nature of cooperating material, kind of surface, polish, etc. are taken into consideration.

Instead of depending on the frictional characteristics of materials, it is also possible to set up frictional areas by treating the record mechanically as by impressing or embossing lines of resistance on the surface of the record card. For example, in Fig. 13 there is shown a portion of a record 204 in cross-section with a pair of channels 220 and 221 formed on opposite sides within a space devoted to one column of a record. Along the top of the embossed ridges formed on the card, and at particular index points, there are impressed a series of transverse depressions 222 designed to present more than the usual frictional resistance to the passage of the record 204 under the serrated points 223 of the sensing fingers 212a. These fingers 212a also have associated therewith the contact making and breaking components illustrated in Fig. 8.

The impulses created by the sensing devices shown in Fig. 8 are initiated at differential times in the same fashion that impulses are initiated through perforations as is common in the art. These impulses are then directed through printing and adding control magnets PM and AM (Fig. 14) along circuit paths which may be followed in the wiring diagram. Circuit breaking devices are provided to prevent the creation of circuits at positions other than the regular index point positions. In this way encountering the edge of each card, and the space between cards, has no effect on the adding and printing devices, even though the sensing finger contacts close at such times.

The circuit may be traced from line 335, through card lever contacts 59a, circuit breaker contacts CBC, along channel 210, finger 212, contact 215, member 209, plug socket 225, plug wire 226, magnet AM, magnet PM and line 334. The energized magnets serve to stop a related type bar in a differential printing position and also clutch the related adding wheel to start entering the amount represented by the mark sensed.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claim is:

1. In a machine controlled by records bearing data representing index points in the form of frictional material differentially spaced on the surface of the records, means for feeding the records, and means for sensing said index points as the record is moved by said feeding means, said sensing means including an insulated holder, a guide mounted on said holder, a contact piece attached to said holder, a movable finger mounted in said guide, a spring for moving said finger within said guide to press it against the record and hold said finger away from said contact piece, a contact extension on said finger located opposite said contact piece and adapted to cooperate therewith when the finger is shifted against the tension of said spring by cooperation with a frictional index point on said record.

2. In a machine controlled by a record element in the form of a sheet bearing indicia on both sides of said sheet, said indicia appearing as areas of a material of different frictional character than that of the surface of the element, said areas being placed differentially to represent data on both sides of said element, sening devices cooperating with both sides of said element to detect the passage of a frictional area and being moved thereby upon detection thereof, and means for feeding the record element between said sensing devices, each of said sensing devices comprising a contact making device made operative by friction when a friction area is encountered.

3. In a machine controlled by records bearing differentially located data representing deposits of material whose frictional characteristic is greater than that of the surfaces of said records; a sensing means, means for moving said records and said sensing means relative to each other, said sensing means comprising a shiftable element bearing upon the surface of said records and tensioned to resist movement in the direction of movement of said records, said element carrying one contact of a pair of contacts, a member carrying another contact positioned opposite the first-mentioned contact and located relative to said first contact in a direction along the line of travel of said record, so that when said element encounters a frictional deposit and is carried along thereby, said contacts will be closed.

4. In a device for detecting areas of differentially located material of less friction than the surface of a record upon which they appear, a sensing means, means for moving said record relative to said sensing means, said sensing means comprising a flexible element bearing upon the surface of said material and tensioned to resist movement in the direction of movement of said record, said flexible element carrying one contact of a pair of contacts, a member carrying another contact opposite the first-mentioned contact and located in a direction opposite the line of travel of said record, so that said relative movement keeps said contacts opened until said element encounters an area of less friction and is released thereby, whereupon said contacts will be closed.

5. In a device for detecting data representations on a record, said representations being present in the form of material softer than the record and of a higher frictional coefficient deposited at index points on said record, a sensing means cooperating with the record, means for moving the record and sensing means relative to each other, a pair of contacts associated with said sensing means, and tensioning means for urging said sensing means into cooperation with the surface of said record and opposite to the direction of feed of said record, so that the sensing means resists movement along with the record until an index point of soft material strikes said sensing means and carries it along therewith to operate said contacts.

6. In a device for detecting data representations on a record, said representations being in the form of deposits of granular material of a lower coefficienct of friction than the record at index points on said record, sensing means, means for moving said record and said sensing means relative to each other, a pair of contacts operated by said sensing means and urged to operated position, and tensioning means cooperating with said sensing means to press said means upon the surface of said record, so that the sensing means is carried along by the surface friction of said record to maintain said contacts in a non-operated position until said sensing means encounters one of said deposits, whereupon said sensing means skids thereover and permits said contacts to move to said operated position.

7. A device for sensing material for differences in friction, a sensing finger mounted on an adjustable flexible blade, means for causing relative movement between said material and finger, said blade being mounted in a holder, an adjustable spring member causing said finger to bear down on the surface of said material, said first mentioned blade being tensioned to resist the movement of said finger along with said material in the direction of movement of the material, a contact on said finger, another contact opposite the first mentioned contact and mounted on a stiff immovable member held in said holder, said contacts being closed when said finger is shifted by encountering an area of differing friction on said material.

8. In a machine controlled by elements bearing printed data and having differentially located data representing deposits of material whose frictional characteristic differs from that of the surfaces of said elements, analyzing means for detecting said deposits including a shiftable structure engaging the surfaces of said elements and normally undisturbed by movement thereof but operated at differential times by changes in frictional relations brought about by encountering said deposits on the moving elements, and control contacts operated by said shiftable structure whenever a deposit of said material is encountered.

WALDEMAR A. AYRES.